(12) United States Patent
Auguste et al.

(10) Patent No.: US 8,405,606 B2
(45) Date of Patent: Mar. 26, 2013

(54) REMOTE CONTROL SYSTEMS AND METHODS FOR ACTIVATING BUTTONS OF DIGITAL ELECTRONIC DISPLAY DEVICES

(75) Inventors: Donna Marie Auguste, Denver, CO (US); David Edward Hayes, Denver, CO (US)

(73) Assignee: Alpha & Omega Inc., Denver, CO (US)

( * ) Notice: Subject to any disclaimer, the term of this patent is extended or adjusted under 35 U.S.C. 154(b) by 334 days.

(21) Appl. No.: 12/830,274

(22) Filed: Jul. 2, 2010

(65) Prior Publication Data
US 2012/0001844 A1    Jan. 5, 2012

(51) Int. Cl.
*G09G 5/00* (2006.01)
(52) U.S. Cl. ........................................ 345/156
(58) Field of Classification Search .............. 345/156, 345/157, 169, 173, 179, 184, 901; 434/98, 434/161, 176, 307 R, 308; 715/776; 348/375
See application file for complete search history.

(56) References Cited

U.S. PATENT DOCUMENTS

| | | | |
|---|---|---|---|
| 4,670,746 A * | 6/1987 | Taniguchi et al. | 340/5.62 |
| 5,252,102 A * | 10/1993 | Singer et al. | 623/24 |
| 5,624,265 A * | 4/1997 | Redford et al. | 434/307 R |
| 6,712,701 B1 | 3/2004 | Boylan, III et al. | |
| 6,822,635 B2 | 11/2004 | Shahoian et al. | |
| 7,386,804 B2 | 6/2008 | Ho et al. | |
| 2001/0035854 A1 * | 11/2001 | Rosenberg et al. | 345/156 |
| 2002/0180273 A1 * | 12/2002 | Konno et al. | 307/10.2 |
| 2003/0214601 A1 | 11/2003 | Yuen | |
| 2005/0147953 A1 * | 7/2005 | Ho | 434/317 |
| 2006/0291149 A1 * | 12/2006 | Suzuki et al. | 361/679 |
| 2008/0114519 A1 * | 5/2008 | DuFaux et al. | 701/70 |
| 2008/0174546 A1 * | 7/2008 | Schneider | 345/156 |
| 2009/0073125 A1 * | 3/2009 | Anastas et al. | 345/167 |
| 2009/0181518 A1 * | 7/2009 | Omata et al. | 438/455 |
| 2009/0201248 A1 * | 8/2009 | Negulescu et al. | 345/157 |
| 2011/0148752 A1 * | 6/2011 | Alameh et al. | 345/156 |
| 2012/0078442 A1 * | 3/2012 | Young et al. | 701/2 |

* cited by examiner

*Primary Examiner* — Joe H Cheng
(74) *Attorney, Agent, or Firm* — TIPS Group

(57) ABSTRACT

A method for controlling an e-book reader, set forth by way of example and not limitation, includes transmitting a digital packet including an address of a button actuator and a button control signal in response to a detection of a button press on a remote control device. The method further includes receiving the packet at the button actuator, decoding the packet in a digital processor to derive the button control signal, and controlling a motor to move a physical actuator between a neutral position and a button press position.

4 Claims, 12 Drawing Sheets

REMOTE CONTROL SYSTEMS AND METHODS FOR ACTIVATING BUTTONS OF DIGITAL ELECTRONIC DISPLAY DEVICES

BACKGROUND

Computerization and the advent of flat panel displays have resulted in a proliferation of digital electronic display devices ranging from plasma televisions to cellular telephones. One particularly fast growing segment of the digital electronic display market are devices designed to display e-books, i.e. books that are distributed in electronic form. "E-books" also include, by way of non-limiting examples, non-traditional "books" comprising documents and collections of printable pages such as handwritten documents, notated music (e.g. sheet music), chord charts, "fake music", lead sheets, court documents, dissertations, theses, journals, periodicals, magazine, lab notebooks, and photographs, to name a few.

E-books are usually read on dedicated digital electronic display devices commonly known as e-book readers, although they are increasingly being read on other types of electronic display devices such as computer displays, laptop computers, tablet computers, personal digital assistants (PDAs) and cellular telephones.

Dedicated e-book readers are often based upon electronic paper displays. Electronic Paper (also known as "e-paper" or "electronic ink") is a display technology designed to mimic the appearance of ordinary ink on paper. Unlike a conventional flat panel computer display, which uses a backlight to illuminate its pixels, electronic paper reflects light like ordinary paper. Furthermore, electronic paper is sometimes capable of displaying text and images indefinitely without drawing electricity.

Examples of e-book readers include the Amazon Kindle®, the Sony PRS-700™ and the Barnes & Noble Nook™. Some e-book readers, such as the Amazon Kindle, use mechanical buttons to navigate to and through an e-book, which other e-book readers, such as the Sony PRS-700, use touch-screen display technology. The Barnes & Noble Nook is a hybrid device including an electronic paper screen, mechanical buttons and a small, color touch screen display.

It should be noted that references to the Amazon Kindle refer to a dedicated hardware e-book reader marketed by Amazon, Inc. Amazon also provides Amazon Kindle software which runs on a variety of platforms, such as computers, cell phones and tablet computers, which will be referred to herein as "Kindle Application Programs."

The introduction of the iPAD™ tablet computer by Apple, Inc. has generated new interest and has heightened competition in the e-book market. The iPAD has a full-color touch-screen display and therefore has the benefits and disadvantages of backlit, flat panel computer displays. The iPAD uses its touch-screen for e-book navigation. The iPAD is provided with e-book reader software, and can also, for example, run Kindle Application Programs for the purpose of buying and reading e-books sold and/or delivered wirelessly by Amazon.

E-book readers are generally intended to be handheld devices and are controlled by pressing a button, either mechanical or virtual, or by making gestures with a finger on a touch screen display. However, there are times when it would be desirable to be able to control a digital electronic display device, such as an e-book reader, without actually touching the device. For example, a musician might desire to use an e-book reader to display sheet music and would not have a hand free for "turning" the pages of the e-book. As another example, a person engaging in a physical activity, such as running on a treadmill, may wish use an e-book reader that is propped up and out of convenient reach. Furthermore, handicapped persons may be physically incapable of using their hands to hold and/or control an e-book reader.

With respect to the last example set forth above, there have been devices made for the handicapped to aid in the reading of ordinary books. For example, Zygo Industries, Inc. markets a manual page turner for conventional books which allows a handicapped person to use a joystick to turn pages forward and backward, one at a time or continuously (e.g. when scanning a chapter or a directory). However, manual page turners of the prior art are unsuitable for use with e-book readers and other forms of digital electronic display devices.

These and other limitations of the prior art will become apparent to those of skill in the art upon a reading of the following descriptions and a study of the several figures of the drawing.

SUMMARY

A remote control system, set forth by way of example and not limitation, includes a remote control device operative to develop a number of button control signals and a button actuator responsive to the button control signals. In an alternative example, the button actuator includes a physical actuator configured to move between a neutral position and a button press position.

An e-book reader page turner system, set forth by way of example and not limitation, includes a remote control device having a case provided with a number of buttons, a digital processor coupled to the buttons, and a digital packet transmitter. The example system also includes a button actuator including a frame configured to engage with an e-book reader, a number of physical actuators supported by the frame and movable with respect thereto, a digital packet receiver, a digital processor coupled to the digital packet receiver, a motor controller coupled to the digital processor, and a number of motors electrically coupled to the motor controller and physically coupled to the number of physical actuators. Preferably, the physical actuators are positioned so as to be aligned with the page turn buttons of the e-book reader.

A method for controlling an e-book reader, set forth by way of example and not limitation, includes transmitting a digital packet including an address of a button actuator and a button control signal in response to a detection of a button press on a remote control device. The method further includes receiving the packet at the button actuator, decoding the packet in a digital processor to derive the button control signal, and controlling a motor to move a physical actuator between a neutral position and a button press position.

These and other combinations and advantages and other features disclosed herein will become apparent to those of skill in the art upon a reading of the following descriptions and a study of the several figures of the drawing.

BRIEF DESCRIPTION OF THE DRAWINGS

Several examples will now be described with reference to the drawings, wherein like components are provided with like reference numerals. The examples are intended for the purpose of illustration and not limitation. The drawings include the following figures.

DETAILED DESCRIPTIONS

Figure 1:
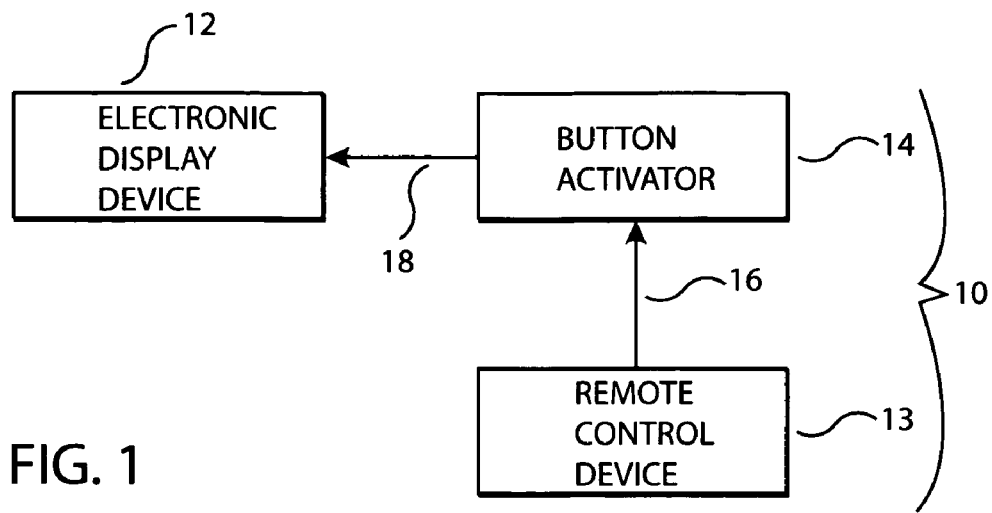
FIG. 1 is a block diagram of an example remote control system for activating buttons of a digital electronic display device.

FIG. 1 is a block diagram of an example remote control system 10 for activating the buttons of a digital electronic display device 12. In this example, the remote control system 10 includes a remote control device 13 and a button activator 14 which can communicate via an interface 16. The button activator 14 can communicate with the digital electronic display device 12 via an interface 18.

As used herein, a "digital electronic display device", "electronic display device", "display device" or the like will refer to any digital electronic device having a screen or display with addressable pixels. Non-limiting examples of digital electronic display devices include e-book readers, desk computers, laptop computers, netbook computers, table computers, personal digital assistants (PDSs) and cellular telephones. The vast majority of current digital electronic display devices use flat-panel displays based upon a variety of technologies including volatile display technologies such as light-emitting diode display (LED), liquid crystal display (LCD) and plasma display technologies and static display technologies such as electronic paper.

Digital electronic display devices typically include a number of buttons to control their functionality. These buttons can be of various technologies, including mechanical buttons, capacitively coupled buttons, touch screen buttons, etc. As used herein, a "button" associated with a digital electronic display device will include any real (e.g. mechanical or capacitive) or virtual (e.g. a button image or the like on a touch screen) button which, when pressed, signals the digital electronic display device to perform some function or act. By "press" it is meant that the button, real or virtual, is capable of being engaged by, for example, by a finger or a stylus, although buttons can be pressed in other fashions as well. Furthermore, "press" can also include gesturing, e.g. such as an engagement with a touch screen display and subsequent movement in contact with the screen.

Digital electronic display devices are becoming increasingly small and portable. Often, they are meant to be handheld devices. The buttons on such displays may be mechanical (such as on the Kindle® e-book reader) or virtual on a touchscreen display (such as on the iPAD™ tablet computer). Still other digital electronic display devices include both real and virtual buttons.

Button activator 14 is often closely associated with digital electronic display device 12. In some cases, button activator 14 is mechanically engaged with digital electronic display device 12, i.e. the interface 18 is mechanical. In other cases, button activator 14 may be a part of the digital electronic display device 12 or be physically separated from the digital electronic display device 12.

Remote control device 13 is generally physically separated from the digital electronic display device 12. In some cases, remote control device 13 is physically separated from button activator 14. In other cases button activator 14 may be a part of the remote control device 13. Remote control device 13 can be used to develop button control signals. By way of example and not limitation, remote control 13 can develop page turn signals for an e-book device such as "Page Forward" and "Page Back" signals.

In the following descriptions, remote control system 10 will be discussed with reference to the specific examples such as the Kindle-DX® e-book reader provided by Amazon, Inc. and the iPAD tablet computer provided by Apple, Inc. These examples are not to be seen as limiting but, rather, illustrative of the general concepts set forth herein.

Figure 2:
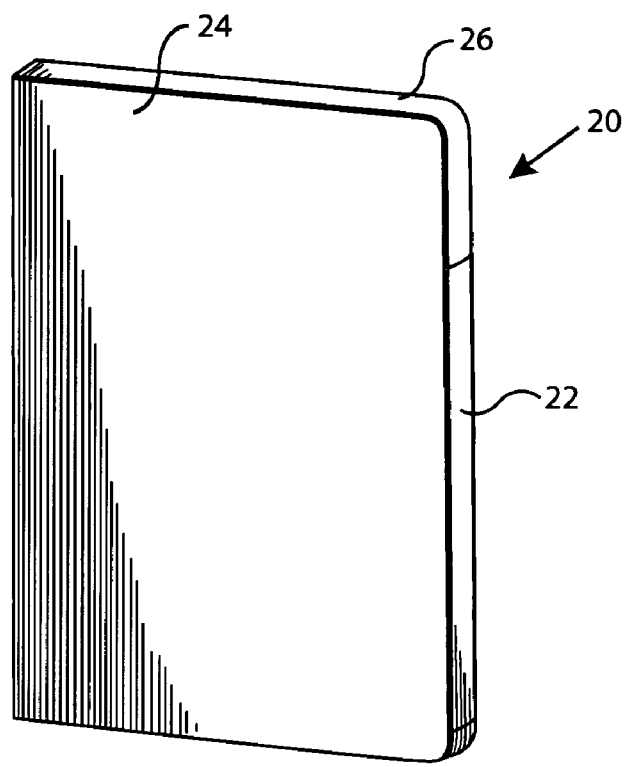
FIG. 2 is a perspective view of an example cover for an e-book reader with an example integrated button activator in a closed configuration.

FIG. 2 is a perspective view of cover 20 for an e-book reader having an integrated button activator 22. The cover is 20 illustrated in its closed position and has a front cover 24 and a back cover 26. The material of cover 20 is preferably thin, yet strong, to protect the e-book reader that may be stored therein. The material, or materials, of at least the back cover 26 are, by way of non-limiting example, sufficiently rigid to provide mechanical stability for the button activator with respect to an e-book reader engaged with, for example, back cover 26.

Figure 3:
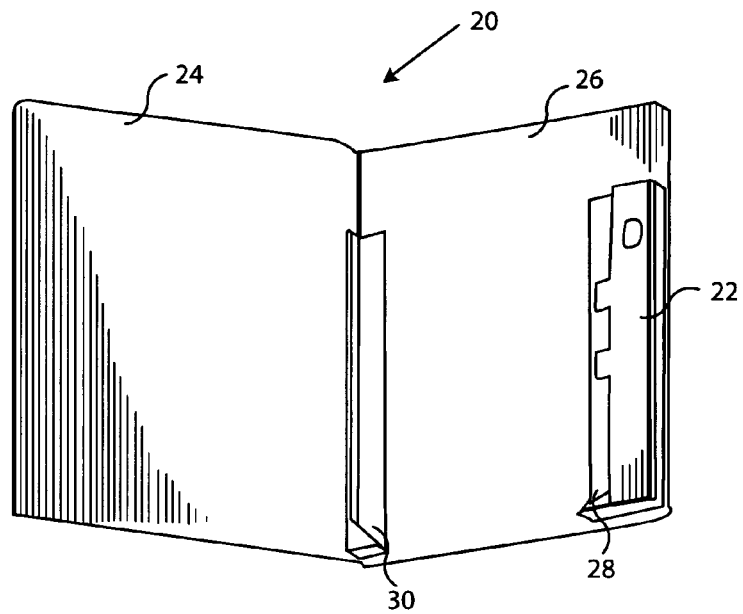
FIG. 3 is a perspective view of the cover of FIG. 2 in a partially opened configuration.

FIG. 3 is a perspective view of the inside of the cover 20 in a partially open configuration. Button activator 22 is attached to the inside of the back cover along its right edge. Part of the button activator 22 includes a frame 28 which is configured to engage the right edge of an e-book reader, such as the Kindle-DX e-book reader. A complementary frame 30 is attached proximate to the left edge of the inside of back cover 26.

Figure 4:
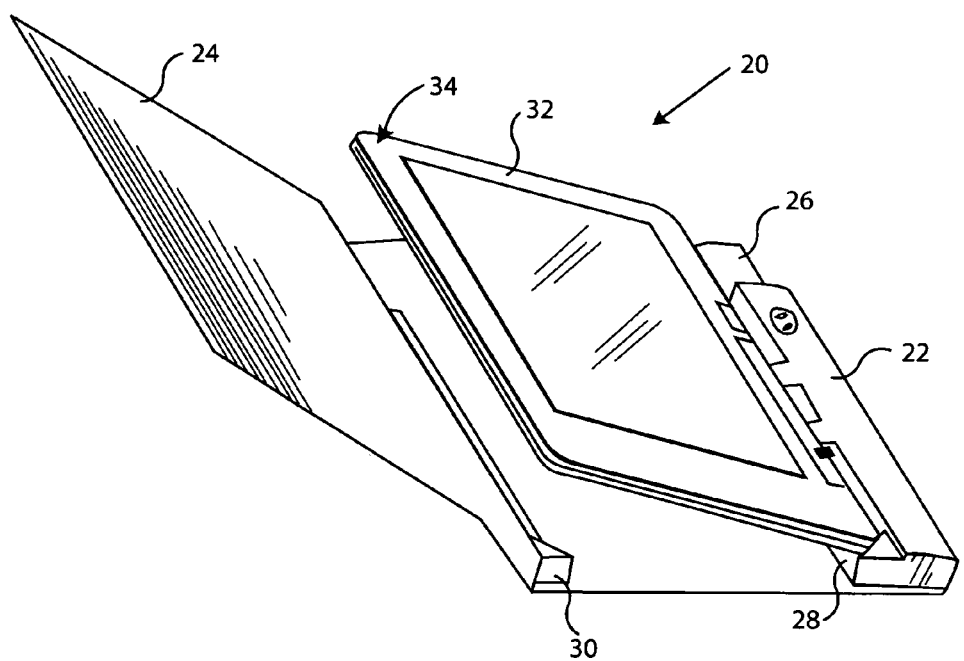
FIG. 4 is a perspective view of the cover of FIG. 3 with an example e-book reader partially engaged with the integrated button activator.
Figure 5:
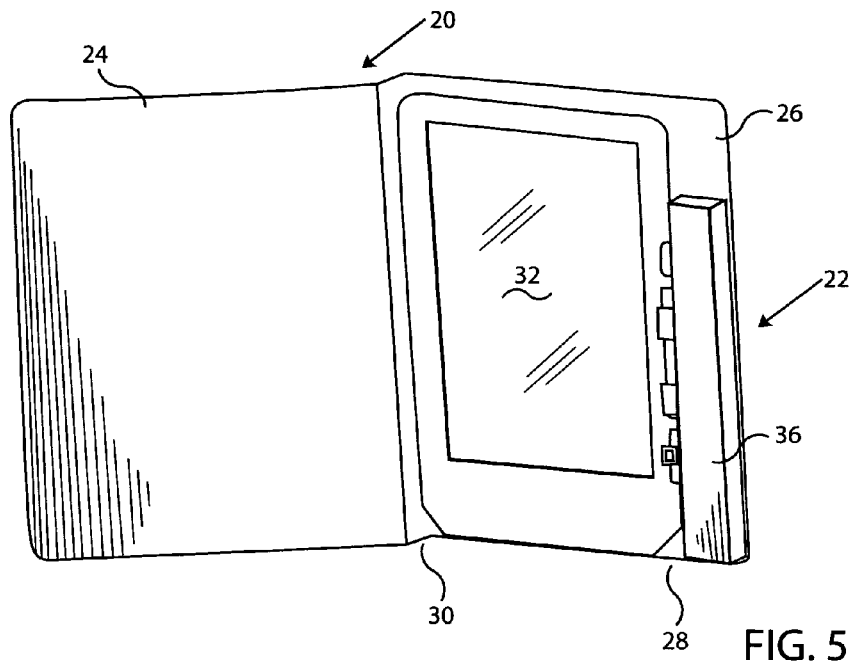
FIG. 5 is a perspective view of the cover of FIG. 3 with an e-book reader fully engaged with the example integrated button activator.

FIG. 4 is a perspective view similar to that of FIG. 3 which illustrates the engagement of a right edge of an example e-book reader 32 with the frame 28 of button activator 22. In this example, the e-book reader 32 continues to pivot down as indicated by arrow 34 until the left edge of the e-book reader 32 engages with the frame 30 and is slid into place as illustrated in FIG. 5. When the e-book reader 32 is in this position, it is firmly engaged with the frames 28 and 30 with its mechanical buttons along its right edge properly aligned with the button activator 22. The buttons of the e-book reader 32 are partially obscured in this view by a lid 36 of the button activator 22. In other non-limiting examples, an e-book reader can be engaged with cover 20 in other fashions, such as by sliding in from the top or bottom, snapping in, adhering to, etc.

Figure 6:
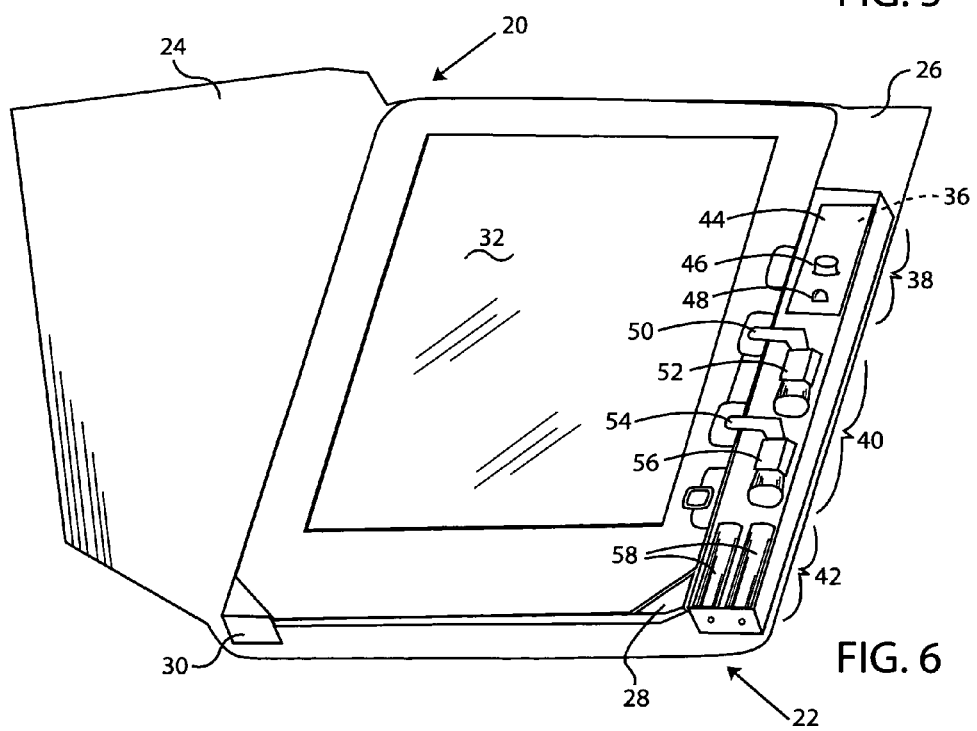
FIG. 6 is a perspective view of the cover of FIG. 6 with a lid portion of the example integrated button activator removed.

In FIG. 6, the cover 36 has been removed, as indicated by the broken line, to expose some of the internal components of button activator 22. The button activator 22 includes a controller zone 38, an actuator zone 40 and a power supply zone 42. The controller zone 38 includes a circuit board 44, a control button 46 and an LED indicator 48. The circuit board 44, by way of non-limiting example, can include a transceiver (or receiver) which can be paired or otherwise communicate with a transceiver (or transmitter) of a remote control device. The circuit board 44 may also include control logic for the actuators in the actuator zone. The actuator zone 40 includes a first actuator 50 coupled to a first motor 52 and a second actuator 54 coupled to a second motor 56. The actuators 50 and 54 are aligned with first and second mechanical switches, respectively, of the e-book reader 32. In this example, the first and second mechanical switches of the e-book reader are the "Page Forward" and "Page Back" buttons. The power supply zone 42, in this example, includes batteries 58. In other embodiments, a power supply may be used to power the button activator 22.

Figure 7:
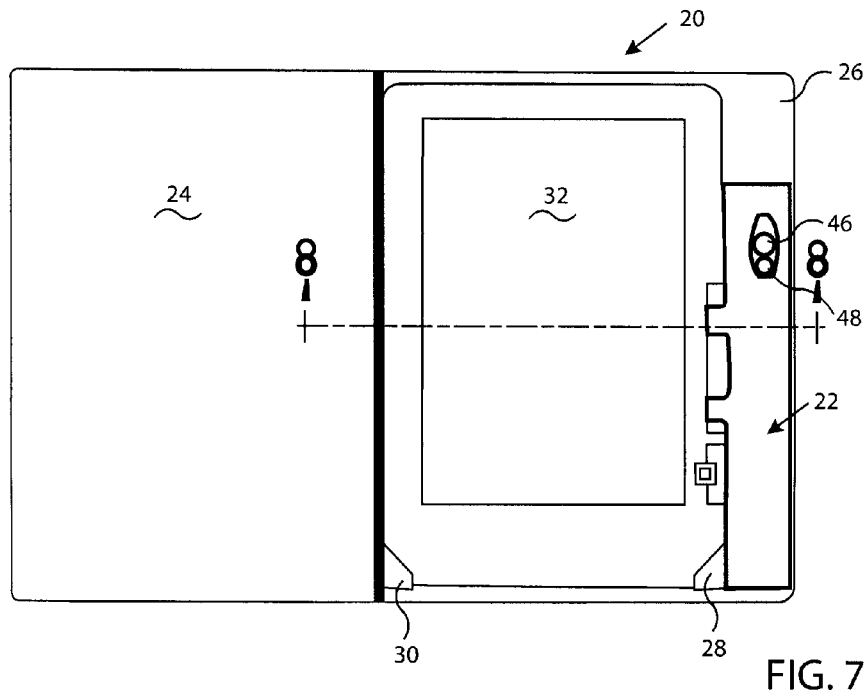
FIG. 7 is a top plan view of the cover of FIG. 2 in a fully open configuration.
Figure 8:
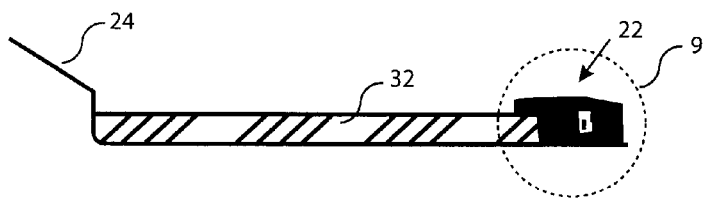
FIG. 8 is a cross-sectional view taken along line 8-8 of FIG. 7.
Figure 9:
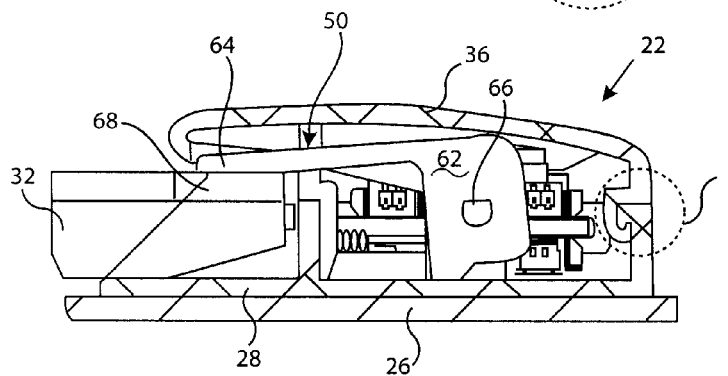
FIG. 9 is an enlargement of the portion of FIG. 8 encircled by line 9.

FIG. 7 is a top plan view of case 20 with e-book reader 32 engaged with frames 28 and 30. FIG. 8 is a cross-sectional view taken along line 8-8 of FIG. 7. FIG. 9 is an enlarged view of the portion of FIG. 8 encircled by broken line 9. In FIG. 9, the frame 28 is attached to inside of the back cover 26 by a suitable fastener such as an adhesive or a mechanical fastener. Cover 36 is hinged to frame 28 at a junction 60. Actuator 50 has a fulcrum portion 62 and an arm portion 64. The actuator 50 can be rotated on an axle 66 coupled to motor 52 (not seen in this view). The tip of arm portion 64 may contact and press on a button 68 of e-book reader 32. As will be discussed in greater detail subsequently, the motor 52 can cause the actuator 50 to be rotated between a neutral and a button-press position. As used herein, a "neutral position" is a position where an actuator is not exerting a pressing force on a real or virtual button that is sufficient to be considered a button push, and a "button-press position" is a position where an actuator is exerting a pressing force on a real or virtual button sufficient to be considered a button push.

The examples of FIGS. 2-9 provide a wrap-around cover 20 which protects an e-book reader while providing mechanical button-pushing capabilities. Other examples may not include a wrap-around cover and/or may not mechanically activate buttons of an e-book reader. For example, a button actuator can be clamped, glued, or otherwise directly attached to an e-book reader without the need for a cover. Also, there are many other examples of wrap-around covers which can be used for e-book readers, including alternate physical and non-physical e-book interfacing configurations.

Figure 10:
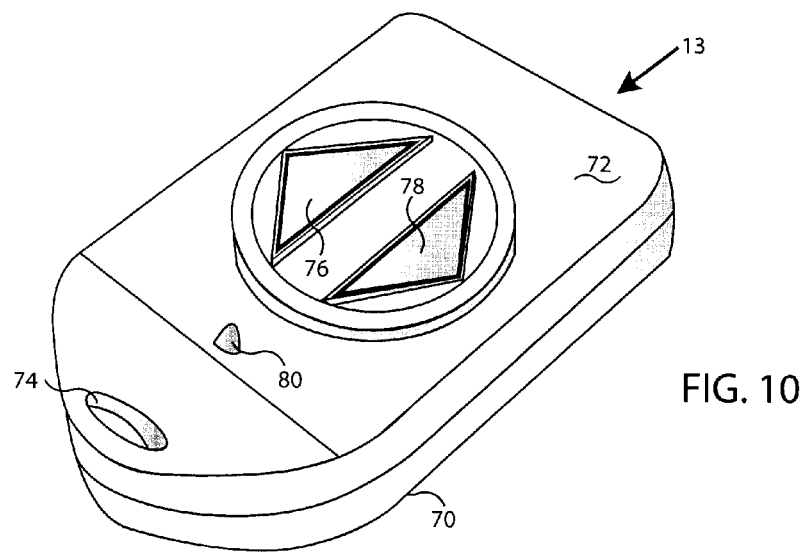
FIG. 10 is a perspective view of an example remote control.

FIG. 10 is an example of a remote control device 13 of FIG. 1. In this example, remote control device 13 is configured as a FOB which can be carried on a keychain or the like. In this regards, it is similar in configuration to an electronic car door opener. Of course, this configuration is just one of many examples suitable for remote control device 13. By way of a further non-limiting example, a remote control device can be configured as a foot-pedal for use by musicians or transcriptionists. Another non-limiting example is that of a handicap-accessibility switch used by a person with limited hand/finger dexterity (e.g. those made by Ablenet, Inc., see http://www.ablenetinc.com/AssistiveTechnology/Switches/tabid/57/Default.aspx).

In the example of FIG. 10, remote control device 13 includes a lower casing 70, an upper casing 72, a keychain aperture 74, a pair of buttons 76 and 78, and an indicator LED 80. In this example, the buttons 76 and 78 are shaped as arrowheads to indicate a forward page turn and a back page turn.

Figure 11:
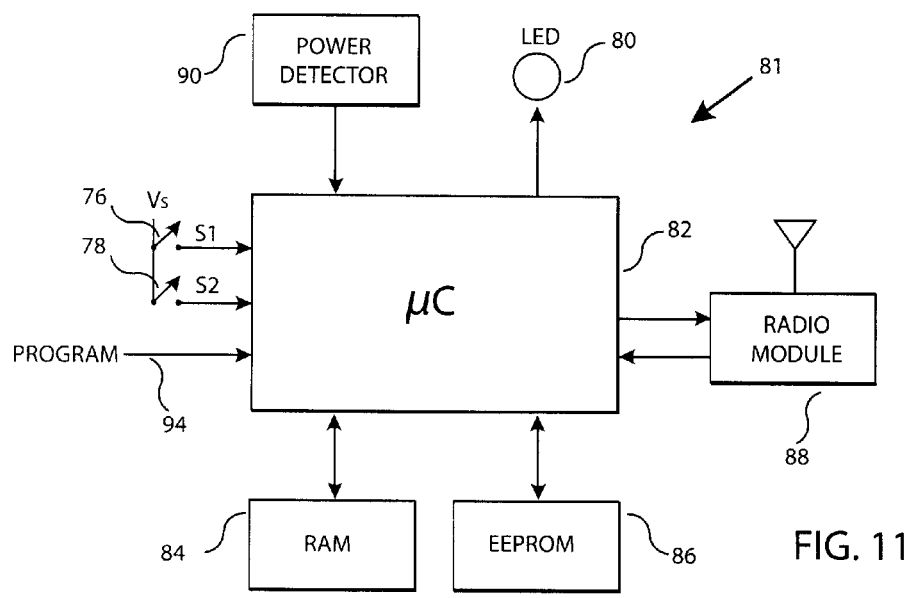
FIG. 11 is an example block diagram of the example remote control of FIG. 10.

FIG. 11 is an example block diagram of the electronic circuitry 81 of the remote control device 13 of FIG. 10. In this example, electronic circuitry 81 includes a microcontroller 82 coupled to the buttons (e.g. switches) 76 and 78, a RAM 84, an EEPROM 86, a radio module 88, a power detector 90, and indicator LED 80. It should be noted that the block diagram of FIG. 11 is illustrating functional blocks and that the components may be arranged differently. For example, the RAM 84 and EEPROM 86 may be integrated into the microcontroller 82 and the power detector 90 may be integrated into the radio module 88. Furthermore, there may be buffering and other intermediate circuitry between, by way of example and not limitation, the buttons 76 and 78 and the microcontroller 82. These and other design variants will be appreciated by those of ordinary skill in the art.

The example remote control device 13 may also include other inputs, not shown, such a 3.5 mm jack to receive alternate switch closures, or other forms of electrical signals, from a user-selected unit. These alternate switch closures may replace, or augment, for example, switches 76 and 78. For example, the aforementioned jack, or other input port, can be used to allow a standardized interface, such as electric foot pedal used by musicians, to provide electrical inputs to the remote control device 13. By way of further example, there are a number of standardized interfaces designed for those with disabilities which can also benefit by being coupled to the remote control device 13.

The radio module 88 may be configured to operate using, for example, the IEEE 802.15.4 protocol. The IEEE 802.15.4 protocol is a standard which specifies the physical layer and media access control for low-rate wireless personal area networks (LR-WPANs). A typical range for this protocol is about 30 feet and the transfer rate is about 250 Kbits/sec. Lower bit rates can be selected with a corresponding reduction in power consumption. The IEEE 802.15.4 protocol allows for a low cost, low power consumption master/slave communication link 16 between remote control device 13 and button activator 14 (see FIG. 1) with built-in retry and collision avoidance protocols.

Preferably, each remote control device 13 will have a unique identifier (typically 64 bits) in accordance with the IEEE 802.15.4 specification. The unique identifier may be stored in EEPROM 86 and can be loaded into the radio module 88 by the microcontroller 82 upon power-up. This will allow a remote control device 13 to be uniquely paired with a corresponding button activator 14. In other examples, a remote control device 13 may be paired with multiple slave units for, for example, musical applications. The EEPROM 86 can be programmed through a port 94 at, for example, the time of production. As another non-limiting example, the EEPROM 86 can be user-programmable.

Figure 12:
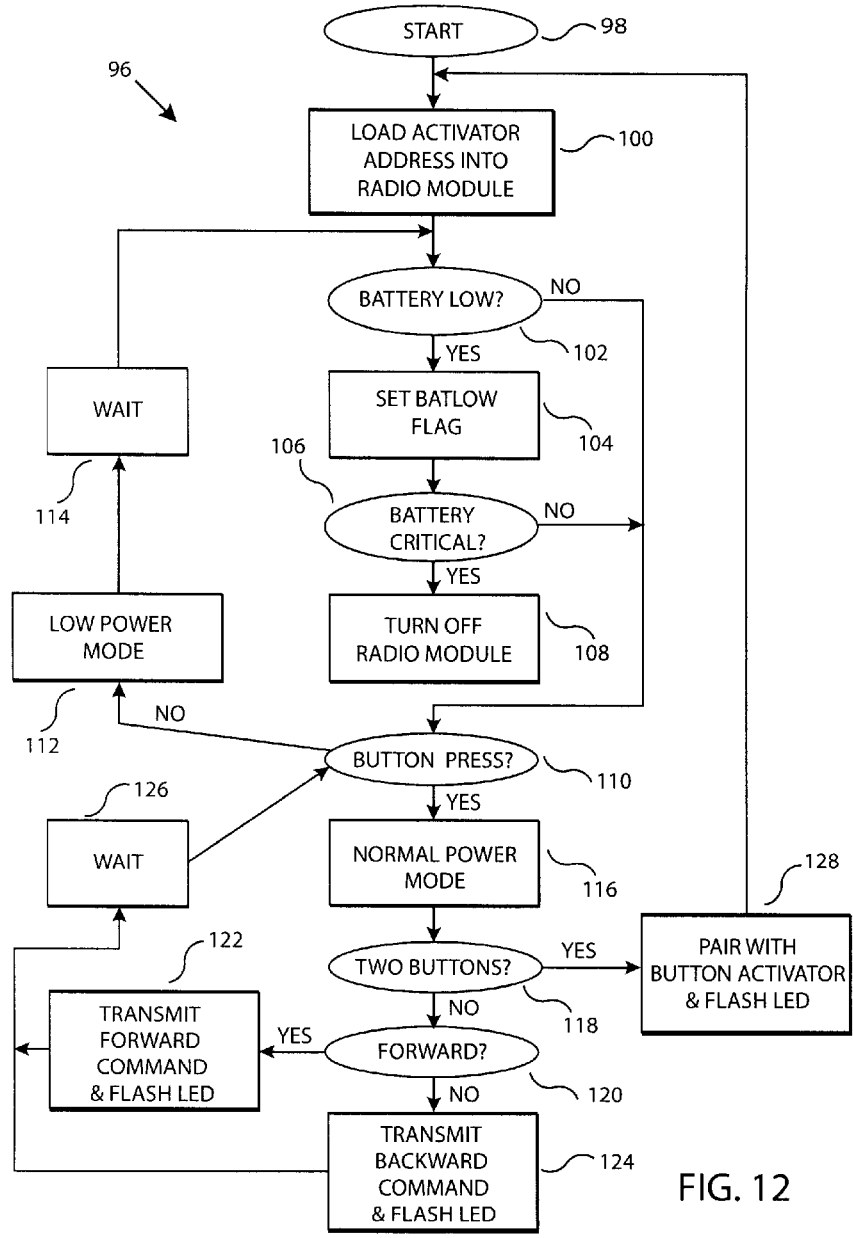
FIG. 12 is a flow diagram of an example process which may be implemented by the example block diagram of FIG. 11.

FIG. 12 is a flow diagram of an example process 96 which may be implemented on the apparatus of FIG. 11. Instructions for microcontroller 82 to implement process 96 may be stored, for example, in the EEPROM 86. Process 96 starts at 98 and, in an operation 100, the address of the button activator 14 (the "slave" in this example) is loaded into radio module 88. Next, in an operation 102, it is determined whether the battery is low on power by, for example, monitoring the power detector 90. If battery power is low, a BATLOW flag is set in an operation 104. If battery power is critically low, as determined by operation 106, the radio module 88 is turned off in an operation 108, effectively disabling the remote control device 13. If there is sufficient battery power to operate normally, process control is then given to operation 110 which looks for a press on button 76, button 78, or both. If a button press is not detected in operation 110, an operation 112 puts the remote control device 13 into a low power mode to conserve energy and then into a timed wait period in an operation 114. After the wait period has elapsed, process control is returned to operation 102.

If operation 110 does detects a push of button 76, 78 or both, an operation 118 determines whether both buttons have been pushed, indicating that the remote control device 13 is to enter a pairing mode, in this example. If both buttons have been pressed, the remote control device 13 is paired with button activator 14 and LED 80 is flashed appropriately in an operation 128. Operational control is then returned to operation 100.

If operation 110 detects the push of only one button, an operation 120 determines which button has been pushed. If the forward button has been pushed, the radio module is caused to transmit a "Page Forward" signal in an operation 122, with the LED 80 being flashed appropriately. If the back button has been pushed, the radio module is caused to transmit a "Page Back" signal in an operation 124, with the LED 80 being flashed appropriately. After transmitting either signal, the process waits as indicated at 126 and then process control is returned to operation 110.

Figure 13:
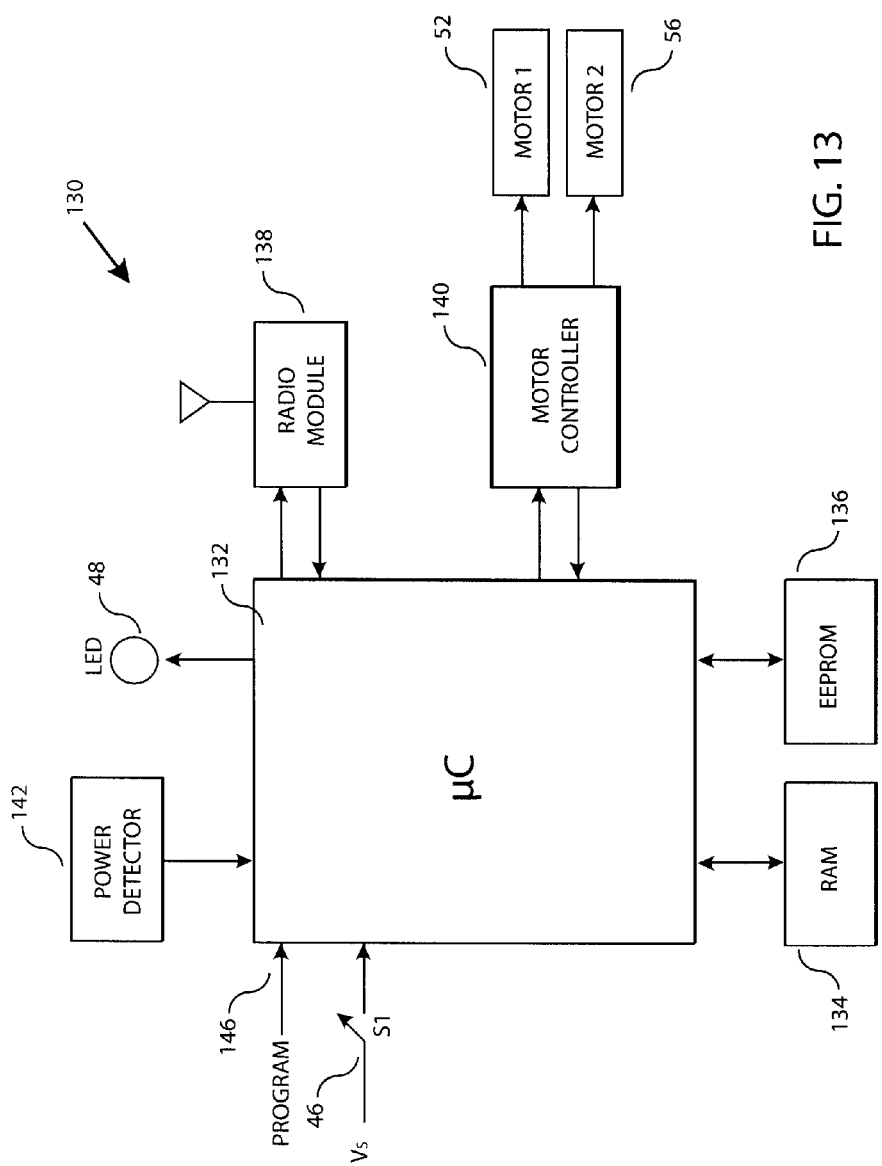
FIG. 13 is an example block diagram of the example button activator of FIG. 2.

FIG. 13 is an example block diagram of electronic circuitry 130 of the button activator 14. In this example, electronic circuitry 130 includes a microcontroller 132 coupled to the buttons (e.g. switch) 46, a RAM 134, an EEPROM 136, a radio module 138, a power detector 142, and the indicator LED 48. A motor controller 140 is coupled between the microcontroller 132 and the motors 52 and 56. It should be noted that the block diagram of FIG. 13 is illustrating functional blocks and that the components may be arranged differently. For example, the RAM 134 and EEPROM 136 may be integrated into the microcontroller 132 and the power detector 142 may be integrated into the radio module 138 or the motor controller 140. Furthermore, there may be, by way of example and not limitation, buffering and other intermediate circuitry between the button 46 and the microcontroller 132. These and other design variants will be appreciated by those of ordinary skill in the art.

The radio module 138, in this example, is also configured to operate with the IEEE 482.15.4 protocol. Preferably, each button activator 14 will have a unique identifier (typically 64 bits). The unique identifier may be stored in EEPROM 86 and can be loaded into the radio module 138 by the microcontroller 132 upon power-up. This will allow a button activator 14 to be uniquely paired as a "slave" with a corresponding "master" remote control unit 13. The EEPROM 138 can be programmed through a port 146 at, for example, the time of production.

Figure 14:
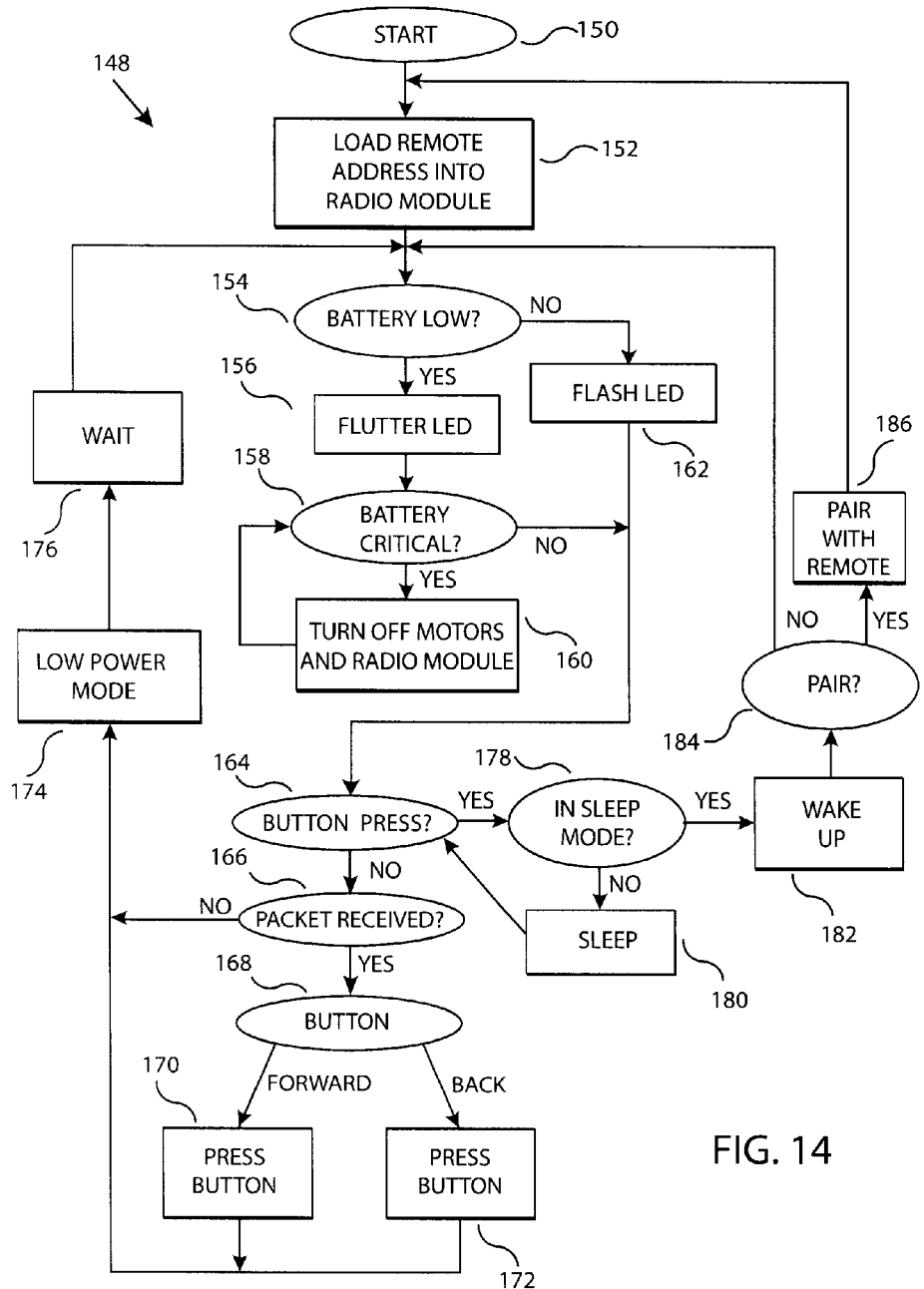
FIG. 14 is a flow diagram of an example process which may be implemented by the example block diagram of FIG. 13.

FIG. 14 is a flow diagram of an example process 148 which may be implemented on the apparatus of FIG. 13. Instructions for microcontroller 132 to implement process 148 may be stored, for example, in the EEPROM 136. Process 148 starts at 150 and, in an operation 152, the address of the paired remote control device 13 is loaded into the radio module 138. Next, in an operation 154, it is determined if the power level of the battery is low. If so, the LED 48 is "fluttered" in an operation 156. If the power level of the battery is critically low as determined by operation 158, the motors 52 and 56 and the radio module 138 are turned off in an operation 160, essentially shutting down the button activator 14. If battery power is sufficient to support operation, the LED either flashes by operation 162 or flutters by operation 156 and operational control is turned over to operation 164

If operation 164 does not detect a pressing of button 46, operation 166 determines whether a packet addressed for the button activator 14 has been received. If not, the button activator 14 enters a low power mode in an operation 174 and then a wait mode in operation 176 before returning to operation 154.

If operation 166 determines that an appropriate packet has been received, an operation 168 determines which button is to be pressed. If the "Page Forward" button is to be pressed, a press button operation 170 is activated. If the "Page Back" button is to be pressed, a press button operation 172 is pressed. Operational control is then given to operation 174.

If a button press of button 46 was detected in operation 164 it is determined whether the button activator 14 is in a sleep mode in an operation 178. If it is not in a sleep mode, an operation 180 puts the button activator 14 into a sleep mode to await another button press in operation 164. If operation 178 determines that the button activator is currently in a sleep mode, it is woke up in a wake up operation 182. An operation 184 then determines if the button activator 14 is to be paired. If so, the button activator 14 is paired with the remote control device 13 in an operation 186 and process control is returned to operation 152. If the button activator 14 is not to be paired, operational control is returned to operation 154.

Figure 15:
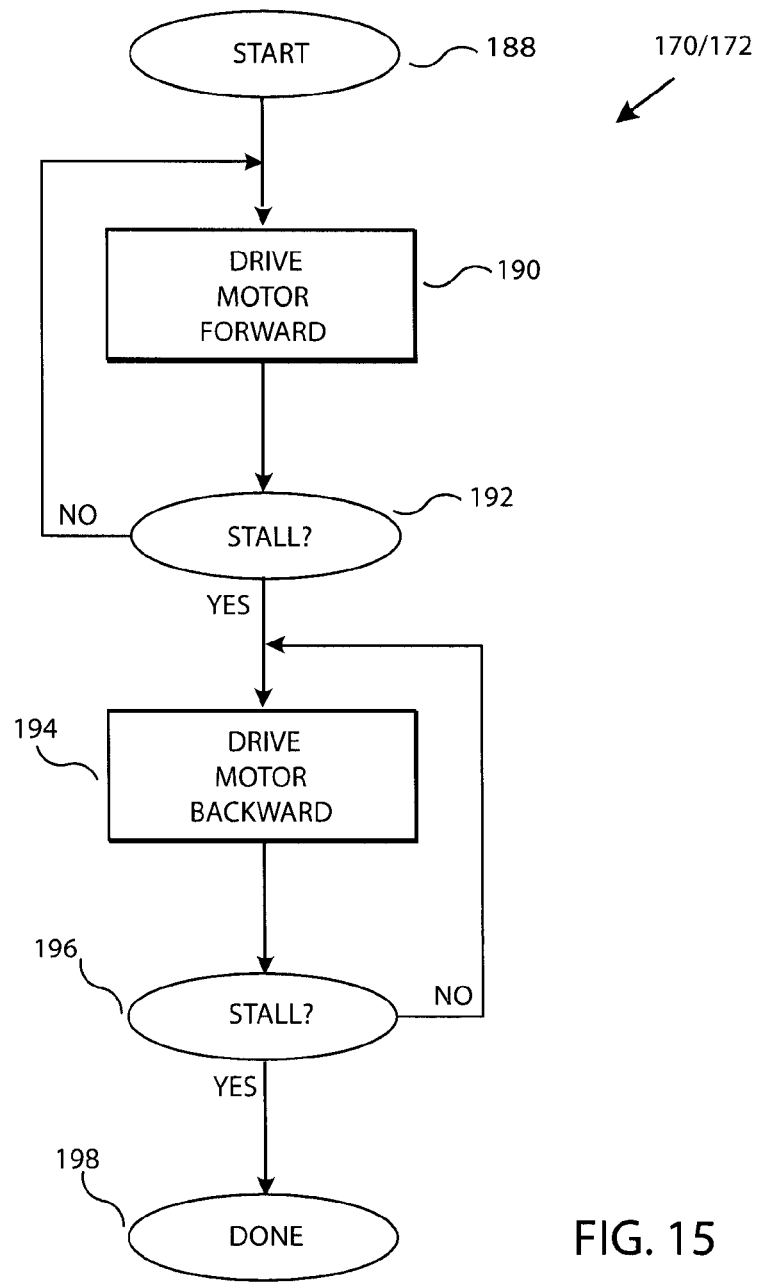
FIG. 15 is a flow diagram of an example process to implement the PRESS BUTTON operation of FIG. 14.

FIG. 15 is a flow diagram illustrating the PRESS BUTTON 170/172 operations of FIG. 14. The processes 170/172 start at 188 and, in an operation 190, the appropriate motor is driven in a forward direction. Then in an operation 192, it is determined whether the motor has "stalled", e.g. can no longer rotate its shaft. This is typically detected by a surge of current being drawn by the motor. If there is no stall, the motor continues to drive the motor forward in operation 190. If a stall condition is detected by operation 192, an operation 194 drives the motor in the reverse or "backward" direction until a stall is detected in an operation 196. The process 170/172 is done at 198.

In another example, button "push back" from an e-book reader button can be used to eliminate the need to reverse the motor as described above. That is, in many cases the button on an e-book reader is spring-loaded to return itself to its unpressed or neutral position. With such examples, the operations 194 and 196 may be skipped or eliminated.

In the examples set forth above, and in other examples, it may be preferable to keep the circuit designs for the remote control device 13 and the button activator as similar as possible. For example, the same microcontrollers and radio modules can be used to allow a sharing of the firmware stored in their EEPROMS. Suitable microcontrollers include the PIC18F25K20T-I/SS processor and suitable radio modules include the MRF24J40MA-I/RM RF module, both available from Microchip, Inc. A suitable motor driver is the MPC17531A motor driver available from Freescale, Inc. Of course, there are many substitutes and equivalents for the components described above. For example, the microcontroller can be replaced with other technologies including microprocessors, state machines, discrete logic, and other forms of digital processors.

Since both the remote control device 13 and the button activator 14 in the examples set forth above are battery powered, preferred embodiments include power management and power level indications. Remote control device 13 can be powered by, for example a 20 mm×3.2 mm coin battery model #CR2032 which has a 22 mAh capacity. Button activator 14 can be powered, for example, by two AAA batteries.

By way of further examples, when the battery on the remote control device 13 is at an acceptable level, the LED 80 can be flashed slowly during radio communication. When a low battery power level is detected, the LED 80 can be "fluttered", e.g. blinked rapidly. Similarly, when battery power is at an acceptable level in the button activator 14, the LED 48 may be flashed slowly to show that it is powered and "listening" for a packet from its paired remote control device 13. If a low battery level is detected, the LED can be caused to flutter. In other examples, fewer or no LEDs can be used, or more LEDs can be used to provide feedback to a user. Multiple outputs can be displayed on a single LED with, for example, software controlled "OR-wired" processes. In still further non-limiting examples, other display technologies, including audio, visual and tactile display can be used.

Besides indicating battery power levels, preferred embodiments may employ power management techniques to reduce power consumption whenever possible. Since radio communications are a major source of power consumption, the radio modules a preferably put into a sleep mode on a regular basis and the microcontroller should be put into a low-power "idle" mode when not being used. By way of example, the radio modules described above can be programmed to wake up the radio module and then the microcontroller after a programmable time period.

The motor controller described above also has an analog-to-digital (A/D) channel which can be used to periodically monitor the battery voltage. This can be used to alert the user of low battery conditions. Preferably, the motor controller also has the capability of entering "deep sleep" to conserve battery life.

As noted previously, the remote control system 10, in the described examples, may implement the IEEE 802.15.4 radio communication protocols with the remote control device 13 being the master and the button activator 14 being the slave. In other examples, other protocols and other relationships may be implemented. In the current example, the remote control device 13 initiates all communications and the button activator 14 "listens" for command packets from the remote control device 13 and will only respond when addressed directly by its "paired" remote or to a "pairing" request broadcast by the remote control device 13 when the button actuator is in a "paring" mode.

The button activator 14 or "slave" device, in this example, will listen during a 20 millisecond window every 200 milliseconds. After the 20 millisecond communication window, the radio and microcontroller will enter low-power modes. This power management technique reduces the "slave" radio power consumption to approximately 10% of that consumed by continuous operation.

The remote control device 13 or "master" device, in the example, will only transmit when a user presses its buttons. Otherwise, its radio module and microcontroller will be in low-power modes. When a button is pressed, the "master" device will transmit a series of 3 command packets every 5 milliseconds until the "slave" device responds with an "ACK" or 200 milliseconds expire. Therefore, the radio module of the "master" can operate either as a transmitter or a transceiver, it being understood that a transmitter is a subset of a transceiver. Likewise, the radio module of the "slave" can operate as either a receiver or as a transceiver, it being understood that a receiver is a subset of a transceiver.

Preferably, the remote control device 13 only transmits once every second. If a user presses buttons more than once per second, they may be queued for transmission at a rate of once per second. These power management techniques on the remote control device 13 reduce power consumption to 20% of continuous operation power consumption.

The motor controller described above is capable of driving two direct current (DC) motors. Only one of the motors should be run at a time. When a command is received to "cycle" a button on a digital electronic display device, the microcontroller will drive the appropriate motor forwardly while monitoring the motor current as was described with respect to FIG. 15. When the current exceeds a predetermined limit (e.g. a stall current of 200-300 mA), the microcontroller will back off the motor and then drive it in reverse until the "stall" current is detected in the other direction. Preferably, the radio module is in a low-power mode while the motor is driven.

By way of example, the microcontroller of the button activator 14 may use software-generated pulse width modulation (PWM) waveforms when driving the motors both for the purpose of power savings and also to "ramp" up the motor speed to extend the life of the motors. A PWM of approximately 100 kHz may be desirable for smooth motor operation. The full speed PWM may have a 50% or greater duty cycle.

To produce the desired PWM, the microcontroller of the button activator 14 may be operated at 16 MHz to produce the PWM waveform and to interleave instructions to read the A/D channel to monitor battery voltage. The A/D channel is preferably configured for continuous operation using a programmable timer such that the firmware needs only to monitor the results registers once the A/D is started. In alternate examples, a hardware PWM may be employed.

In the example above, when the two buttons on the remote control device 13 are pressed simultaneously for a period of time (e.g. 4 seconds) the remote control device 13 is put into a pairing mode. On the other hand, when the button on the button activator 14 is pressed for a period of time (e.g. 5 seconds) the button activator 14 enters a "deep sleep" mode as was described with respect in FIG. 14. Pressing the button on the button activator 14 when it is in deep sleep for a period of time (e.g. 2 seconds) will wake it from the deep sleep. If the button is continued to be held for a longer period of time (e.g. 5 seconds) the button activator 14 enters the "pairing" mode.

During pairing, only the remote control device 13 and the button activator 14 should be in pairing mode within the range of their radio modules. The remote control device 13 periodically sends out a "pairing" request packet. When the button activator 14 receives the pairing request packet, it will transmit a "pairing" response packet. When the remote control device 13 receives the "pairing" response packet, it will send a second "pairing" request packet directly to the button activator 14 (not broadcast). Once the button activator 14 receives the "pairing" request packet with its address, it is paired with the remote control device 13 and stores the address of the remote control device 13 in its EEPROM, overwriting any previously stored address.

In the foregoing examples, rotary DC motors were employed due to price and power considerations. However, as used herein, the term "motor" includes any electromechanical transducer including linear solenoids, rotary solenoids, piezoelectric motors, "muscle wire" nitinol memory wire, etc.

Figure 16A:
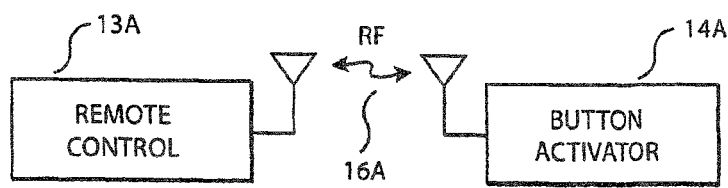
FIGS. 16A-16E illustrate various examples of communication between example remote controls and example button activators.
Figure 16B:
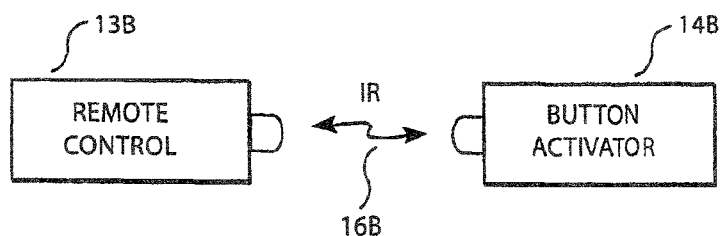
Figure 16C:
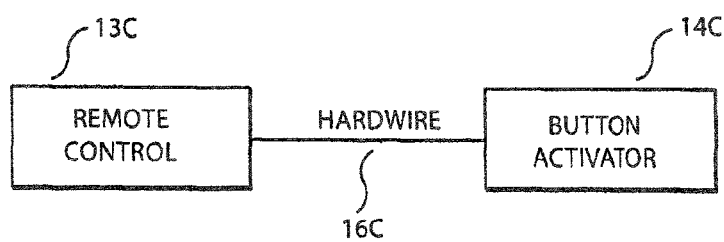
Figure 16D:
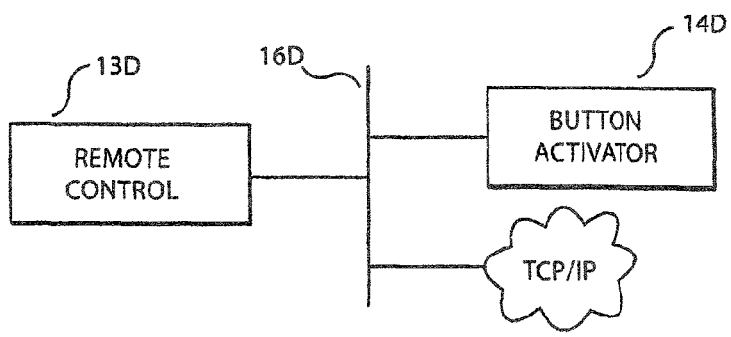
Figure 16E:
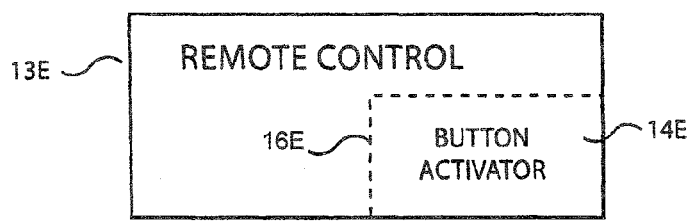

FIGS. 16A-16E illustrate various interfaces 16 between remote control device 13 and button activator 14. In FIG. 16A, a remote control device 13A communicates with a button activator 14A by a radio frequency (RF) interface 16A. The RF interface can be of a variety of protocols, including Wi-Fi, Bluetooth, etc. In FIG. 16B, a remote control device 13B communicates with a button activator 14B by an infrared (IR) interface 16B. In FIG. 16C, a remote control device 13C communicates with a button activator 14C by a hardwire interface 16C, e.g. a wire, cable or electrical connector. In FIG. 16D, a remote control device 13D communicates with a button activator 14D by a network interface 16D. The network interface 16D (which can be wired or wireless) can include a TCP/IP network connection, e.g. the Internet. In FIG. 16E, a remote control device 13E communicates with a button activator 14E by an integrated interface 16E by becoming a part of the remote control device.

Figure 17A:
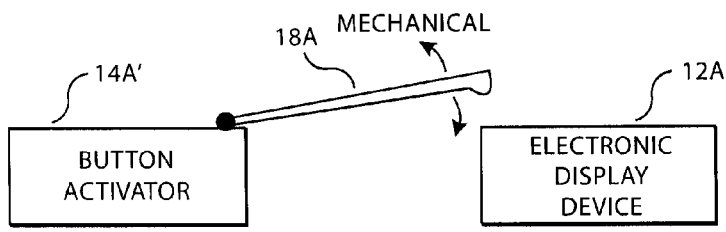
FIGS. 17A-17E illustrate various examples of communication between example button activators and example electronic display devices.
Figure 17B:
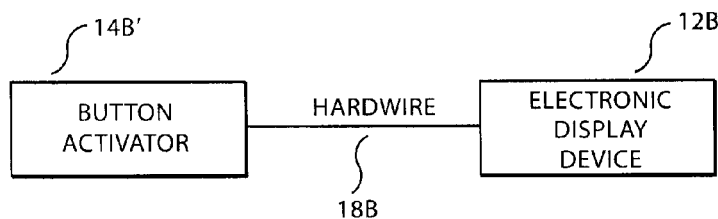
Figure 17C:
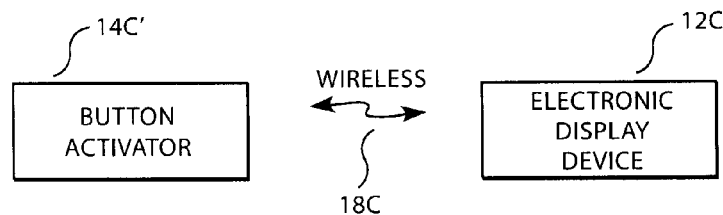
Figure 17D:
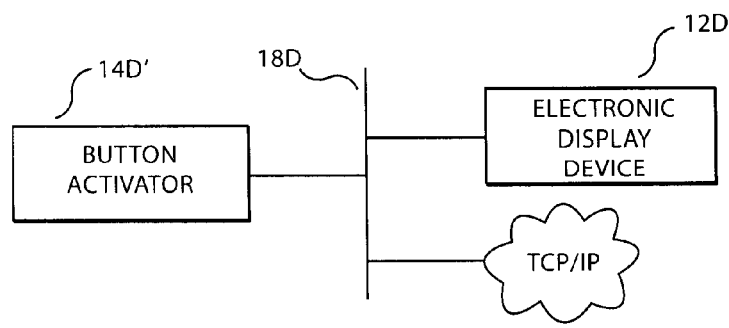
Figure 17E:
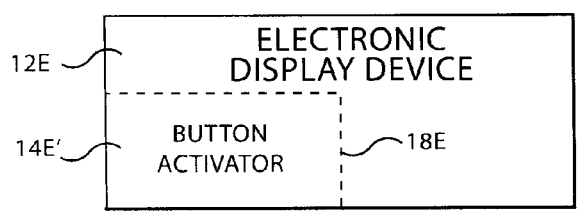

FIGS. 17A-17E illustrate various interfaces 18 between button activator 14 and digital electronic display device 12. In FIG. 17A, a button activator 14A' communicates with a digital electronic display device 12A by a mechanical interface 18A. In FIG. 17B, a button activator 14B' communicates with a digital electronic display device 12B by a hardwire interface 18B, e.g. a wire, cable or electrical connector. In FIG. 17C, a button activator 14C' communicates with a digital electronic display device 12C by a wireless interface 18C. The wireless interface may be electromagnetic (such as RF or IR signals), acoustic, etc. In FIG. 17D, a button activator 14D' communicates with a digital electronic display device 12D by a network interface 18D. The network interface 18D (which can be wired or wireless) can include a TCP/IP network connection, e.g. the Internet. In FIG. 17E, a button activator 14E' communicates with a digital electronic display device 12E by an integrated interface 18E by becoming a part of the electronic display device.

As noted above, the interface between a button activator and an electronic display device may be mechanical, hardwired, wireless, networked or integrated, by way of non-limiting examples. As a further example of a hardwired interface of FIG. 17b is an interface through an input/output (I/O) port of an e-book reader. For example, the Apple iPad/iPhone ("iPhone OS") devices (which can serve as e-book readers) include a docking port along a bottom edge. In an embodiment, logic is provided which provides control signals to an iPhone OS device via its docking port. This may be facilitated, by way of non-limiting example, by interfacing with an Apple NSNotification object (which is a form of notification dispatch table) using Apple's EAAccessory Framework API.

With the non-limiting example set forth above, a forward button pressed on, for example remote control device 13, may cause a receiving circuit to develop a packet for the iPhone OS device docking port with a control command or signal, e.g.:

[[NSNotificationCenter defaultCenter] postNotificationName@"swipe left" object: self]

Continuing with this non-limiting example, a reverse or "backward" button pressed on, for example remote control device 13, may a receiving circuit to develop a packet for the iPhone OS device docking port with a control command or signal, e.g.:

[[NSNotificationCenter defaultCenter] postNotificationName@"swipe right" object: self]

An advantage of using an electronic interface between a button activator 14B' and an electronic display device 12B of FIG. 17b is that electromechanical components, such as motors or other actuators, can be eliminated, resulting in lower costs, lower power consumption and less wear on the button activator. It will further be appreciated that the buttons of the iPhone OS device are "activated", in this example, without ever being physically pressed.

Figure 18:
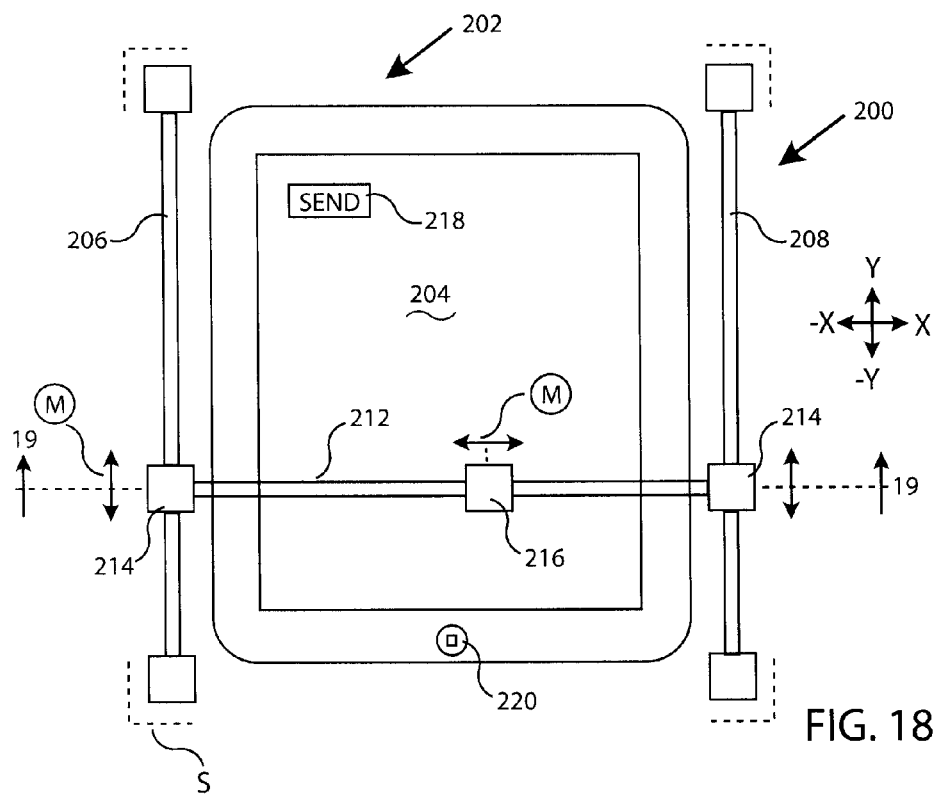
FIG. 18 is a top plan view of an example button activator suitable for use with digital electronic display devices having touch screens.
Figure 19:
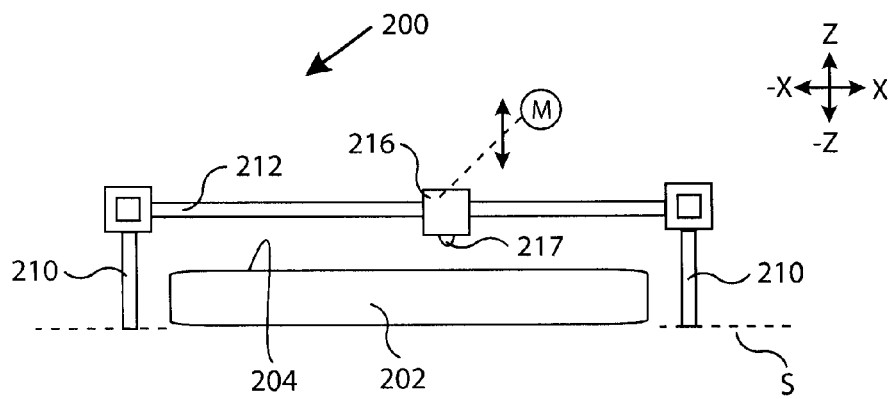
FIG. 19 is a cross-sectional view taken along line 19-19 of FIG. 18.

FIG. 18 is a top plan view of an example button activator 200 suitable for use with a digital electronic display device 202 having a touch screen 204 such as an iPAD tablet computer. FIG. 19 is a cross-sectional view taken along line 19-19 of FIG. 18. With respect to FIGS. 18 and 19, the example button activator 200 includes a pair of rails 206 and 208 supported over a support surface S by posts 210. A rail 212 extends between sliders 214 such that rail 212 may slide along rails 206 and 208 in a ±Y direction. A carriage 216, which includes a protrusion 217 on its bottom side, is engaged with rail 212 such that it may slide along line rail 212 in a ±X direction. The carriage can also move in a ±Z direction between a neutral and button press position wherein the protrusion 217 engages the touch screen 204. It should be noted that the X, Y and Z dimensions are generally orthogonal in this example. Movement in the X, Y and Z directions is accomplished by a number of motors M which are preferably under microcontroller control.

In operation, the carriage 216 can be positioned over a virtual button on touch screen 204, such as a virtual button 218 labeled "SEND", or over a mechanical button, such as button 220 by moving the carriage 216 in the X and/or Y directions. A button press can be effectuated by moving the carriage 216 in the X and Y directions when it is in its "neutral" position until it is aligned with the button, and then moving the button in the −Z direction to press the button.

It should be noted that the button activator 200 can also make gestures on the on the touch screen by moving the carriage 216 in X and/or Y directions while it is still engaged with the touch screen 204. More complex gestures can be made by providing additional, independently controllable carriages.

Although various examples have been described using specific terms and devices, such description is for illustrative purposes only. The words used are words of description rather than of limitation. In addition, it should be understood that aspects of various other examples may be interchanged either in whole or in part. It is therefore intended that the claims be interpreted in accordance with their true spirit and scope and without limitation or estoppel.

What is claimed is:

1. A remote control system comprising:
    a remote control device operative to develop a plurality of button control signals; and
    a button actuator responsive to said button control signals, wherein said button actuator includes
    a) a frame configured to engage a digital electronic display device,
    b) a physical actuator configured to move with respect to said frame between a neutral position and a button-press position,
    c) a motor coupled to said physical actuator to move said physical actuator between said neutral position and said button-press position,
    d) a digital controller operative to develop motor control signals,
    e) a motor controller coupled between said digital controller and said motor, and
    f) a remote control interface coupled to said digital controller and operative to receive said plurality of button control signals from said remote control device;
    whereby when said frame is engaged with a digital electronic display device, said remote control device is operative to cause said physical actuator to press a real or virtual button of said digital electronic display device and thereby control a functionality of said digital electronic display device.

2. A remote control system as recited in claim 1 wherein movement of said physical actuator between said neutral position and said button press position includes movement in a first dimension, and wherein said physical actuator is further configured for movement in a second dimension generally orthogonal to said first dimension.

3. A remote control system as recited in claim 2 wherein said physical actuator is further configured for movement in a third dimension generally orthogonal to said first dimension and said second dimension.

4. An e-book reader page turner system comprising:

a remote control device including a case provided with a plurality of buttons, a digital processor coupled to said plurality of buttons, and a digital packet transmitter; and a button actuator including a frame configured to engage with an e-book reader, a plurality of physical actuators supported by said frame and movable with respect thereto, a digital packet receiver, a digital processor coupled to said digital packet receiver, a motor controller coupled to said digital processor, and a plurality of motors electrically coupled to said motor controller and physically coupled to said plurality of physical actuators, wherein said plurality of physical actuators are positioned so as to be aligned with a plurality of page turn buttons of said e-book reader.

* * * * *